United States Patent
Hull (10) Patent No.: US 7,311,934 B2
(45) Date of Patent: Dec. 25, 2007

(54) **METHOD OF INHIBITING THE GROWTH OF *CLOSTRIDIUM PERFRINGENS* IN MEAT PRODUCTS**

(75) Inventor: Richard S. Hull, Franklin, TN (US)

(73) Assignee: WTI, Inc., Athens, GA (US)

( * ) Notice: Subject to any disclaimer, the term of this patent is extended or adjusted under 35 U.S.C. 154(b) by 17 days.

(21) Appl. No.: 10/285,356

(22) Filed: Oct. 31, 2002

(65) Prior Publication Data

US 2003/0091706 A1 May 15, 2003

Related U.S. Application Data

(60) Provisional application No. 60/345,034, filed on Nov. 9, 2001, provisional application No. 60/351,081, filed on Jan. 22, 2002.

(51) Int. Cl.
*A23B 4/20* (2006.01)
*A23L 1/314* (2006.01)
*A23L 1/318* (2006.01)

(52) U.S. Cl. ....................... 426/281; 426/332; 426/641

(58) Field of Classification Search ................ 426/281, 426/332, 335, 641, 654
See application file for complete search history.

(56) References Cited

U.S. PATENT DOCUMENTS 2,417,806 A * 3/1947 Bauer et al. .................. 426/92
5,302,406 A 4/1994 Ludwig
5,436,017 A 7/1995 Ludwig et al.
2003/0091706 A1 5/2003 Hull

FOREIGN PATENT DOCUMENTS

JP 361192275 A * 8/1986

OTHER PUBLICATIONS

International Food Information Serive (IFIS), Frankfurt-Main, DE; 1985 Kondaiah N Et al; "Effect of chemical dips on unchilled fresh beef inoculated with *E. coli, S. aureus, S. faecalis* and *Cl. perfringens* and stored at 30 C and 20 C.", XP002309731, Database accession No. 85-3-11-s0120 abstract.

Biosciences Information Service, Philadelphia, PA, US; 1992. Mahapatra CM et al: "Effect of chemical dipping on quality and sehlf-life of dressed chicken during storage," XP002309732, Database accession No. PREV199395038060.

* cited by examiner

*Primary Examiner*—Arthur L. Corbin
(74) *Attorney, Agent, or Firm*—McDermott Will & Emery LLP

(57) ABSTRACT

Improved and outgrowth protection against *Clostridium perfringens* in meat products is obtained by incorporating into the meat product 0.05 to about 2% of sodium acetate or sodium diacetate in addition to about 0.2% to about 4% of citric acid buffered sodium citrate.

25 Claims, 9 Drawing Sheets

FIG.2

Temperature profile of roast beef during chilling

FIG. 3

C. perfringens spore counts in roast beef after inoculation (INOC), after heat treatment (HEAT), and after chilling (CHILL). (I (2%): Ional at 2%; I (4.8%): Ional at 4.8%; IP5 (2%) Ional buffered at pH5, at 2%; IP5 (4.8%): Ional buffered at pH5, at 4.8%; SL(2%): Sodium lactate at 2%; SL(4.8%): Sodium lactate at 4.8%).

FIG. 3

FIG. 4

C. perfringens total counts in roast beef after inoculation (INOC), after heat treatment (HEAT), and after chilling (CHILL). (I(2%): Ional at 2%; I(4.8%): Ional at 4.8%; IP5 (2%) Ional buffered at pH5, at 2%; IP5(4.8%): Ional buffered at 4.8%; SL(2%): Sodium lactate at 2%; SL(4.8%): Sodium lactate at 4.8%)

FIG. 4

METHOD OF INHIBITING THE GROWTH OF *CLOSTRIDIUM PERFRINGENS* IN MEAT PRODUCTS

CROSS REFERENCE TO RELATED APPLICATION

This application is related to our copending provisional applications 60/345,034 filed 9 Nov. 2001 and 60/351,081 filed 22 Jan. 2002.

FIELD OF THE INVENTION

Our present invention relates to a method of treating meat products to inhibit the growth of *Clostridium perfringens*, possibly other microorganisms, and to a composition for that purpose.

BACKGROUND OF THE INVENTION

It is known to treat meats, especially fowl, with a buffered solution of sodium citrate, marketed under the name "IONAL" to inhibit microorganism growth.

Experience has shown that *Clostridium perfringens* may be present in meat even after such treatment and in ready-to-eat, i.e. fully cooked meat, may develop an outgrowth.

Labbe, R. G., and C. L. Duncan (1970) Growth from spores of *Clostridium perfringens* in the presence of sodium nitrite. Appl. Microbiol. 19:353-359 reported that nitrite, at commercially used levels prevented outgrowth of high numbers of *Clostridium perfringens* spores even when nitrite was unheated and spores were held at 113° F. (45° C.) within the growth range of *Clostridium perfringens.*

Vareltzis, K., E. M. Buck and R. G. Labbe (1984), Effectiveness of betalains/potassium sorbate system versus sodium nitrate for color development and control of total aerobes, *Clostridium perfringens* and *Clostridium sporogenes* in chicken frankfurters. J. Food Prot. 47: 532-536 reported that a betalains/potassium sorbate system could be used to replace nitrite in frankfurters to inhibit germination and outgrowth of *Clostridium perfringens* and *Clostridium sporogenes*. Several of the earlier studies were performed with germination and outgrowth of *Clostridia* at a static temperature, and not at abusive temperatures during cooling of meat products.

Blankenship, L. C., S. E. Craven, R. G. Leffler, and C. Custer (1988), Growth of *Clostridium perfringens* in cooked chili during cooling. Appl. Microbiol. 54: 1104-1108 and Juneja, V. K., R. C. Whiting, H. M. Marks, and O. P. Snyder. (1999), Predictive model for growth of *Clostridium perfringens* at temperatures applicable to cooling of cooked meat, Food Microbiol. 16: 335-349 evaluated the outgrowth of *Clostridium perfringens* during cooling of chili and autoclaved ground beef, respectively.

OBJECTS OF THE INVENTION

It is the principal object of the present invention to prevent or inhibit the outgrowth of *Clostridium perfringens* in ready-to-eat or fully cooked meat products.

Another object of the invention is to increase the effectiveness of buffered sodium citrate solutions, such as those which are found in U.S. Pat. Nos. 5,302,406 and 5,436,017 (IONAL®) in the treatment of meat products.

DESCRIPTION OF THE INVENTION

We have found that buffered sodium citrate solutions and especially compositions containing sodium citrate and citric acid, sodium citrate and sodium diacetate ($CH_3COONa.CH_3COOH$), sodium citrate and sodium acetate ($CH_3COONa$) and more particularly, citric-acid buffered sodium citrate in combination with one or more of citric acid, sodium diacetate and sodium acetate are effective in preventing bacterial spores in meat treated with the solution from germinating when the meat product is cooled after cooking.

More particularly, while the IONAL has been found to be effective in reducing microorganism levels in meat prior to cooking it has not been recognized that it and combinations of it with sodium diacetate and/or sodium acetate are effective in limiting the germination of *Clostridium perfringens* in ready-to-eat, i.e. fully cooked meat products.

The solutions of the invention can be introduced into the meat products by massaging them into the meat products or injecting them into the meat products or both by a massaging and injecting operation. The solution is introduced at any time prior to cooking or even during the cooking operation and it has been found that, after cooking a while the product is cooling, *Clostridium perfringens* germination and outgrowth does not occur.

The effective usage range for buffered sodium citrate and the blends is 0.5 to 4.0% (as sodium citrate). The preferred range usage is typically 1.0-1.3% (as sodium citrate).

The compositional ranges for each of the products we tested is as follows:

1. IONAL (buffered sodium citrate)
pH range 4.0 to 5.8
Composition: sodium citrate 75-95%
citric acid 5-25%
2. IONAL with sodium diacetate
pH range 4.0-5.8
Composition: sodium citrate 65-95%
sodium diacetate 5-35%
3. IONAL with sodium acetate
pH range 4.0-5.8
Composition: sodium citrate 65-95%
sodium acetate 5-35%

The method of the invention comprises the treatment of all meat products to inhibit the growth and germination of *Clostridium perfringens*, especially outgrowth of *Clostridium perfringens* in cooked meat which comprises incorporating into a meat product at any time but preferably during the processing of the meat before it is cooked or packed, although incorporation during cooking is possible as well, of sodium acetate or sodium diacetate in conjunction with sodium acetate preferably introduced in the form of IONAL such that the contents in the meat of sodium citrate is about 0.2% to about 4% by weight and the content of sodium acetate in the meat is about 0.05% to about 2% by weight.

The sodium acetate or diacetate may be combined with IONAL for introduction into the meat in the form of a common solution.

BRIEF DESCRIPTION OF THE DRAWING

The above and other objects, features, and advantages will become more readily apparent from the following description, reference being made to the accompanying drawing in which:

SPECIFIC DESCRIPTION AND EXAMPLES EFFECT OF IONAL PLUS AND SODIUM DIACETATE

A composition termed IONAL plus was tested which consisted of IONAL with sodium diacetate supplemented with sodium acid pyrophosphate. The sodium acid pyrophosphate is present as a process aid to prevent caking. The compositions are applied as solutions in water but the amounts used are given in terms of sodium citrate and disodium acetate. 1% IONAL for example corresponds to 1% by weight sodium citrate in the meat.

IONAL® PLUS with sodium diacetate:
sodium citrate 75-85% by weight
sodium diacetate 5-15% by weight
citric acid 5-15% by weight
Sodium acid pyrophosphate 1-2% by weight The composition consisted of ground beef samples (20% fat) which were purchased from a local retail store. Ground beef was divided into three equal parts. The first part was designated as control sample (no IONAL™ and 0.1% sodium diacetate). The second and third parts were mixed with 1% IONAL™, and a combination of 1% IONAL™ and 0.1% sodium diacetate, respectively. Samples were placed into commercial ground beef packaging bags and stored at 4° C.

Total aerobic counts of samples were performed daily. The bags of each treatment were selected randomly. Samples were homogenized and diluted using 0.1% peptone water (Difco Laboratories, Detroit, Mich.). Enumeration of total aerobic bacterial count of samples was performed on Tryptic Soy Agar (TSA) plates incubated at 35° C. for 24 hr. Experiments were repeated three times.

Figure 5:
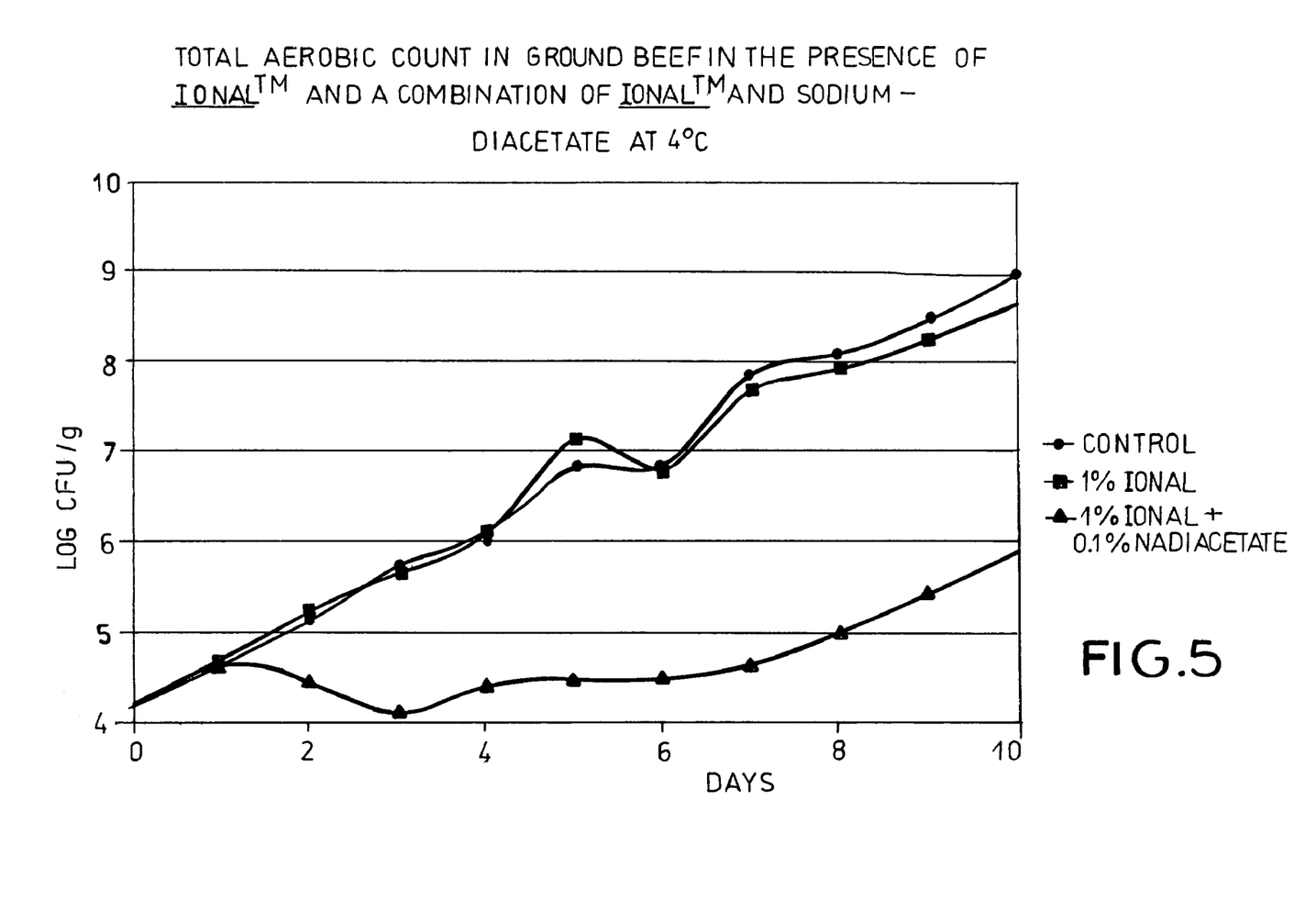
FIG. 5 is a graph of the total aerobic count in ground beef in the presence of IONAL and a combination of IONAL and sodium diacetate.
Figure 6:
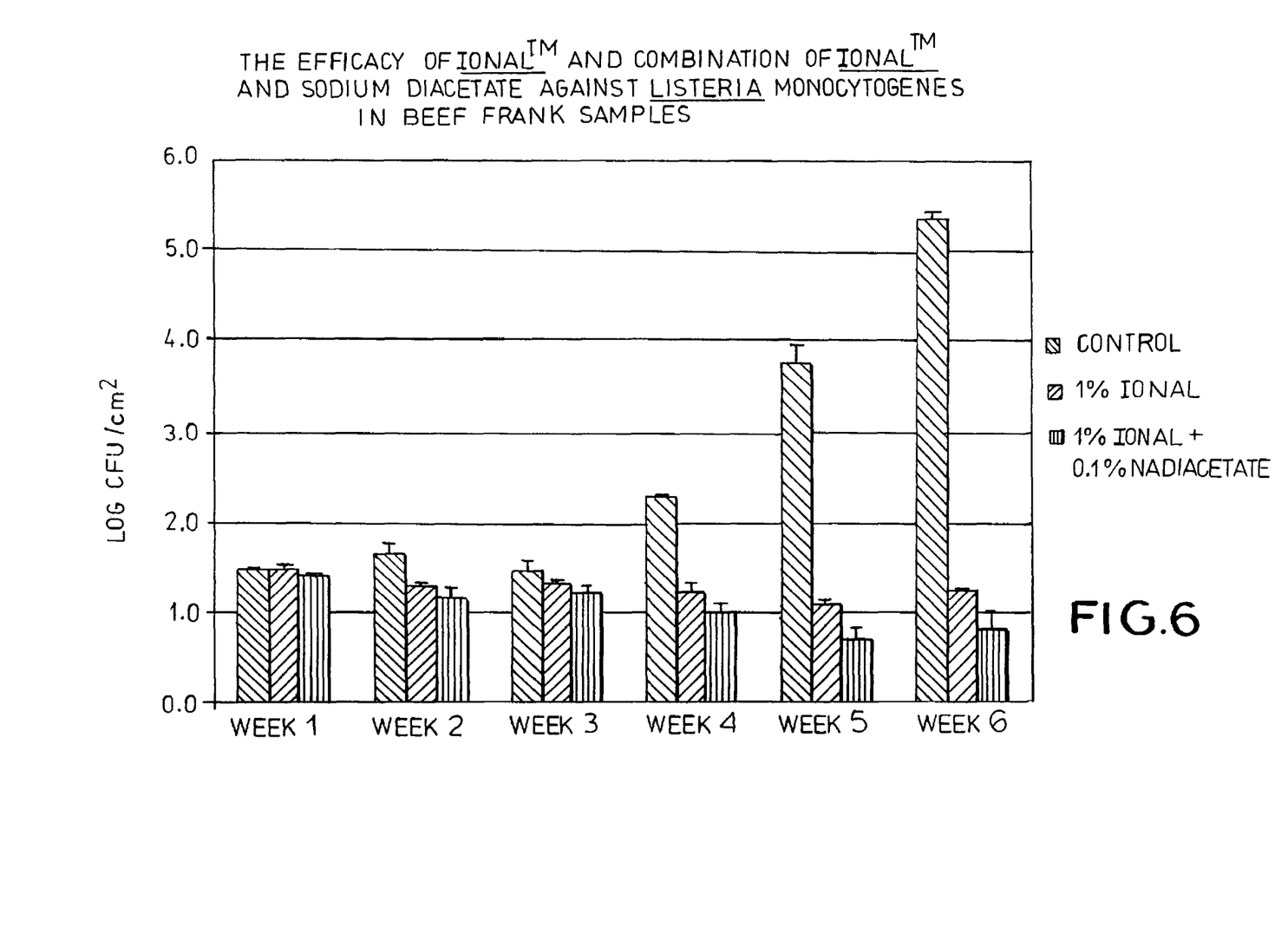
FIG. 6 is a graph showing the effectiveness of the combination against *Listeria monocitogenesis* in beef frank samples.
Figure 7:
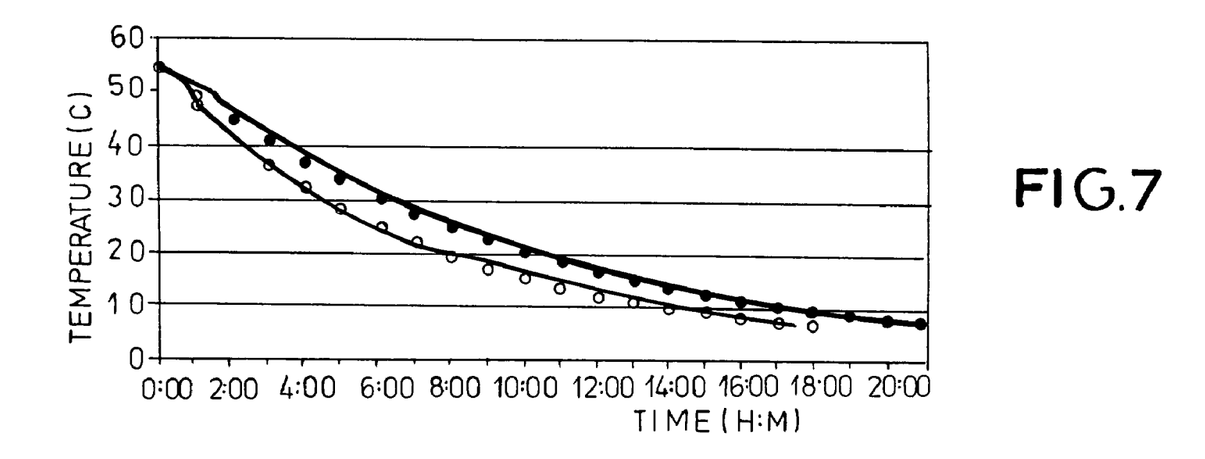
FIG. 7 is a graph of representative temperature profiles of meat products (roasts beef and injected pork) chilled from 54.4° C. to 7.2° C. in 18(○) and 21 h (●), continuous lines indicate actual temperatures observed during chilling, while symbols represent the programmed temperature profile.
Figure 8:
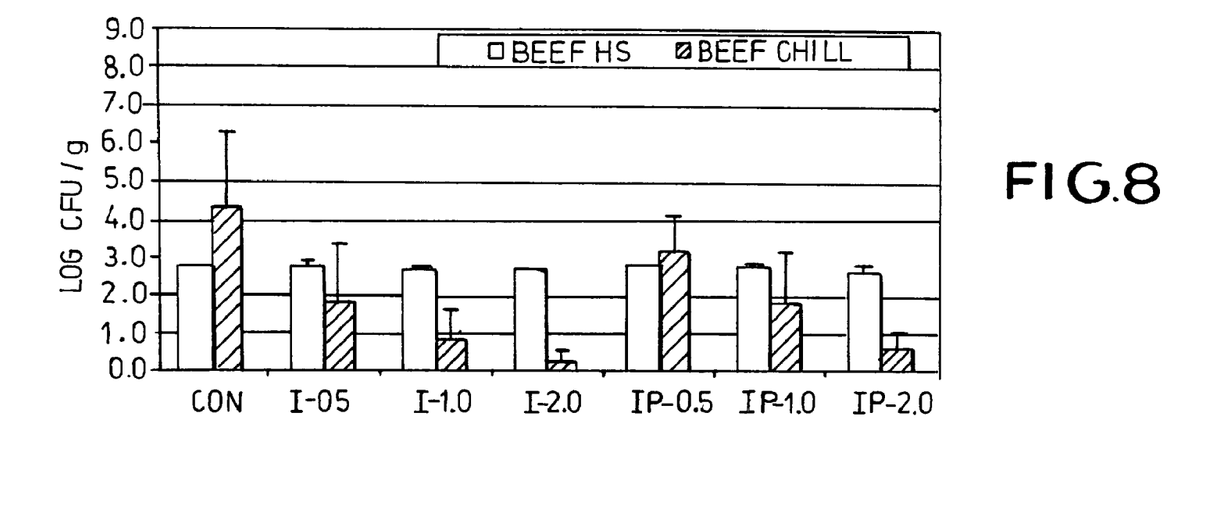
FIG. 8 is a graph of mean log CFU/g populations of *C. perfringens* in roast beef immediately after heat shock (.large circle.; 75. degree. C. for 20 mm), and following cooling (.box-solid.) from 54.4.degree. C. to 7.2. degree. C. exponentially in 18 h (I:IONAL.™; IONAL PLUS.™; 0.5, 1.0 and 2.0: concentrations of I or IP; Con:Control)
Figure 9:
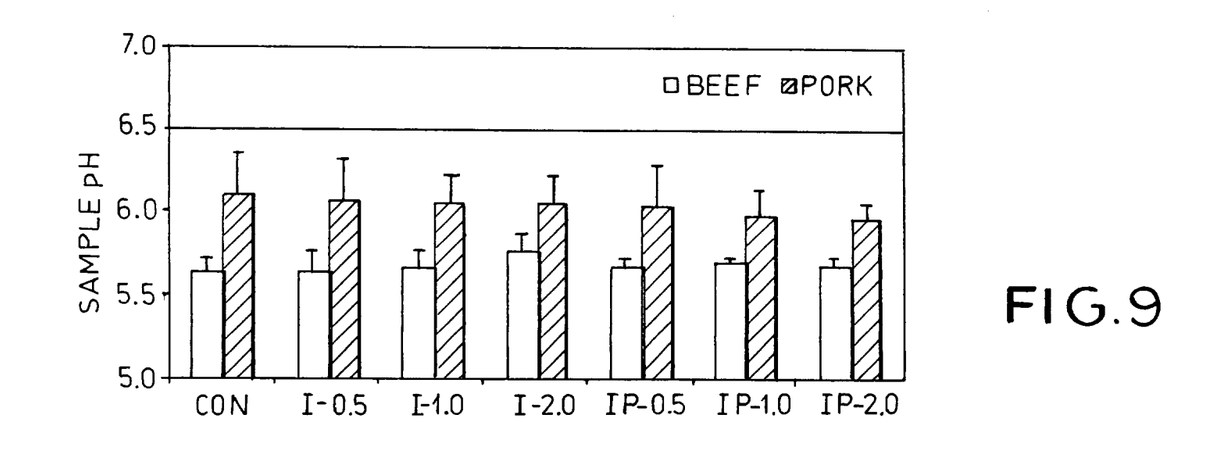
FIG. 9 is a graph of mean pH values of roast beef and injected pork samples for control (CON), IONAL.™ (I) and IONAL PLUS.™ (IP) added meat products. (0.5, 1.0 and 2.0: Concentrations of I and IP for each of the meat products.
Figure 10:
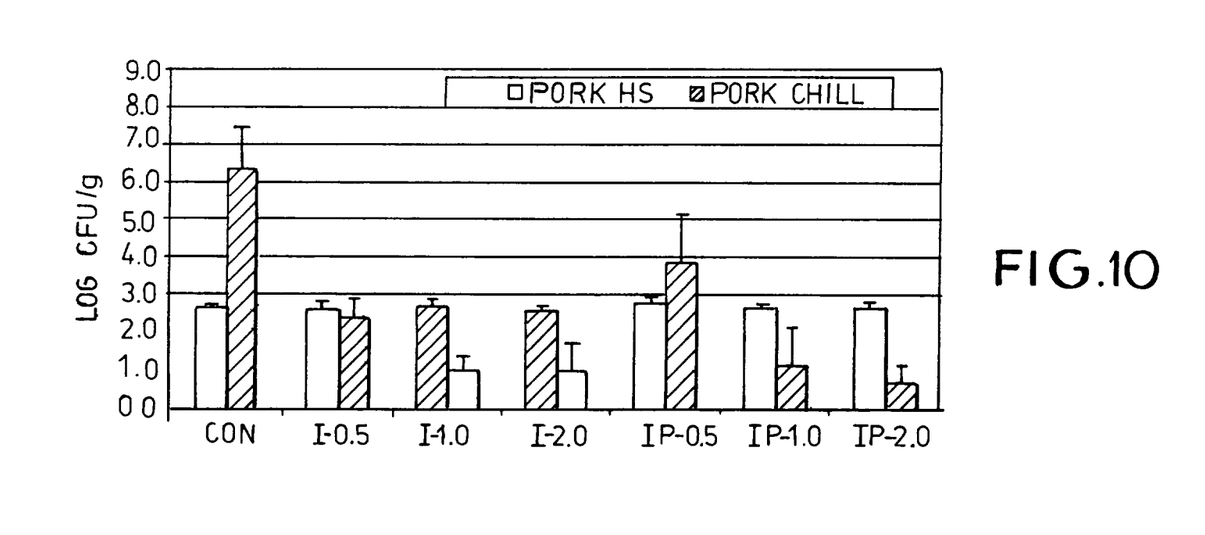
FIG. 10 is a graph of mean log CFU/g populations of *C. perfringens* in injected pork immediately after heat shock (○; 75° C. for 20 min), and following cooling (■) from 54.4° C. to 7.2° C. exponentially in 18 h (I:IONAL™; IONAL PLUS™; 0.5, 1.0 and 2.0: concentrations of I or IP; Con: Control)
Figure 11:
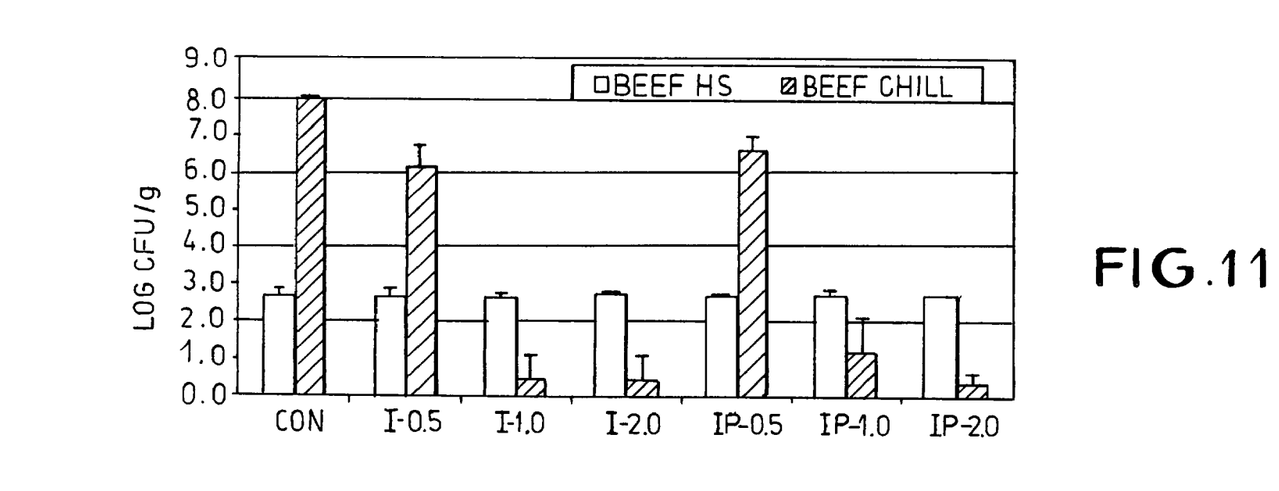
FIG. 11 is a graph of mean log CFU/g populations of *C. perfringens* in roast beef immediately after heat shock (○; 75° C. for 20 min), and following cooling (■) from 54.4° C. to 7.2° C. exponentially in 21 h (I:IONAL™; IONAL PLUS™; 0.5, 1.0 and 2.0: concentrations of I or IP; Con: Control)
Figure 12:
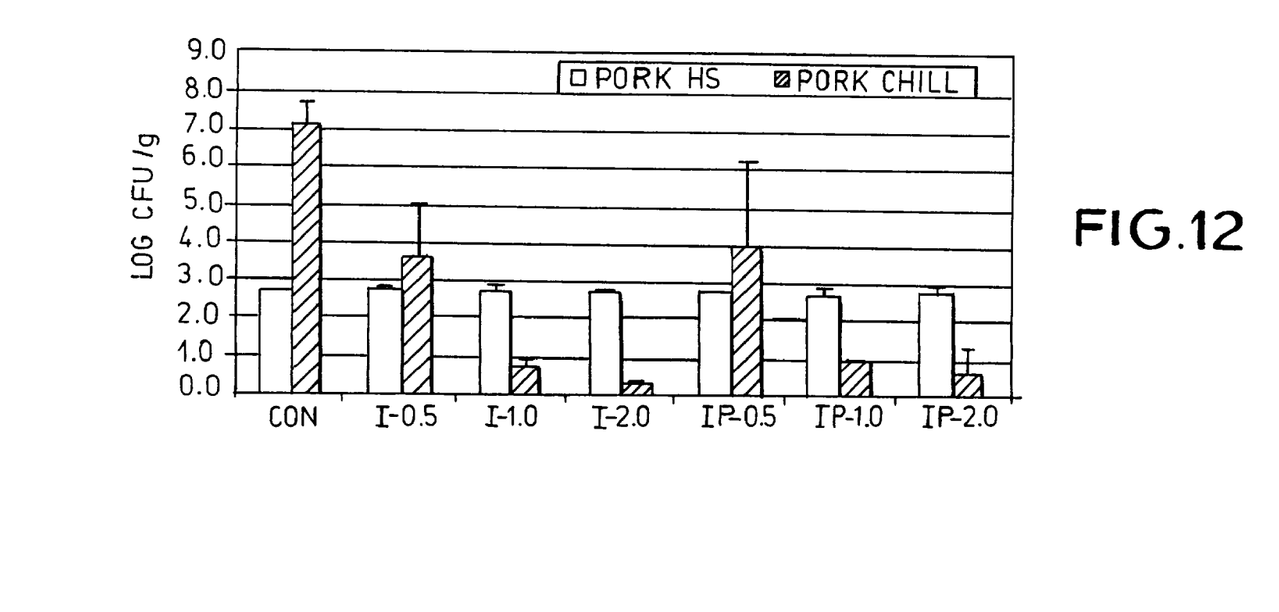
FIG. 12 is a graph of mean log CFU/g populations of *C. perfringens* in injected pork immediately after heat shock (.smallcircle.; 75. degree. C. for 20 mm), and following cooling (.box-solid.) from 54.4. degree. C. to 7.2. degree. C. exponentially in 21 h (I:IONAL.™; IP: IONAL PLUS; 0.5, 1.0 and 2.0: concentrations of I or IP; Con:Control).

Total aerobic count of ground beef samples were shown in FIG. 5. In control and 1% IONAL™ treatment, total aerobic count gradually increased from the initial level of 4.2 cfu/g to 6.85 and 6.83 log cfu/g, respectively, after 10 days of storage at 4° C. Both treatments reached the spoilage index number of 7.0 log cfu/g, after the 5$^{th}$ day of storage at 4° C. On the other hand, in the combination of 1% IONAL™ and 10 days of storage at 4° C. These results indicate that the combination of 1% IONAL™ and 0.1% sodium diacetate might suppress the growth of total aerobic count and increase the shelf life of ground beef.

Effect Against *C. perfringens*

Bacterial Cultures and Inoculum Preparation: Three strains of *C. perfringens* NCTC 8238 (Hobbs serotype 3), and NCTC 10340 (Hobbs serotype 13) were obtained from Eastern Regional Research Center (USDA-ARS, Wyndmoor, Pa.). Individual strain were maintained in cooked meat medium at 4° C. Active cultures were prepared in freshly made fluid thioglycolate broth and sporulation and carried out in Duncan and Strong sporulation medium as described by Juneja et al (1994). After sporulation, each strain was washed twice and resuspended in sterile distilled water, and spore suspensions were stored at 4° C. A spore cocktail containing all three stains of *C. perfringens* was prepared immediately prior to experiments by mixing appropriate numbers of spores from each suspension.

Preparation of Roast Beef and Inoculation: Beef muscle (450 g; inside round) was obtained from KSU meat laboratory and ground through a ⅛" plate. Roast beef was prepared by addition of salt (1.5%), water (10%), and sodium tripolyphosphate (STPP) successively, with mixing for 30 s after addition of each ingredient. The inoculum containing the spore cocktail was added to provide a spore level of ca. 2.5-3.0 log CFU/g, mixed for 30 s and subsequently, the antimicrobials were added and mixed for 30 s and vacuum packaged. Inoculated meat (25 g) was placed in the cook-in bag (2.5×3 in), and vacuum packaged as described previously. A control sample (without *C. perfringens*) was prepared, a thermocouple (T-type, 32 gauge, Omega, Stamford, Conn.) was placed in the center of the product, and vacuum packaged.

Figure 1:
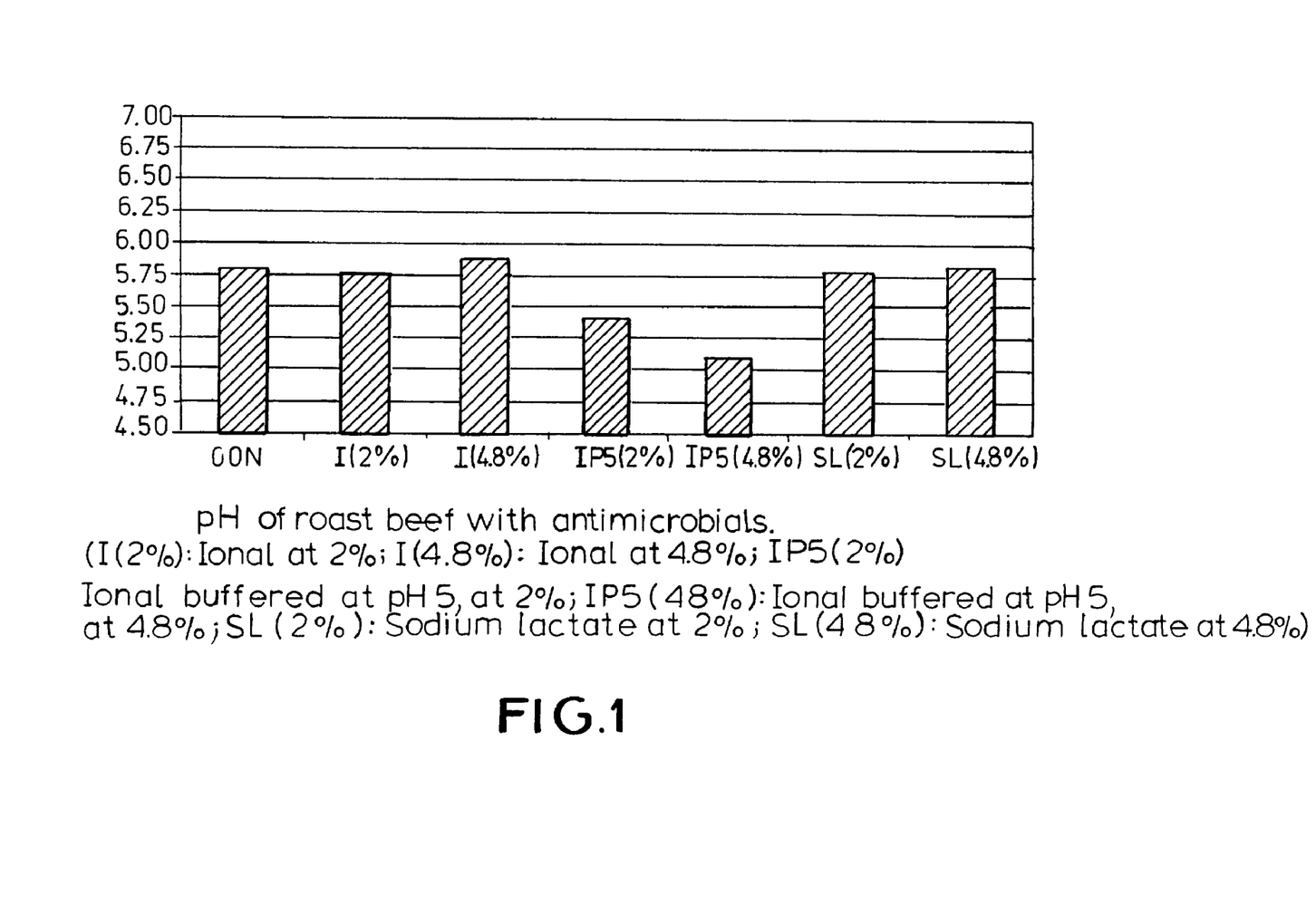
FIG. 1 is a graph showing results obtained for various concentrations of IONAL and other agents in the treatment of roast beef and illustrating the invention.
Figure 2:
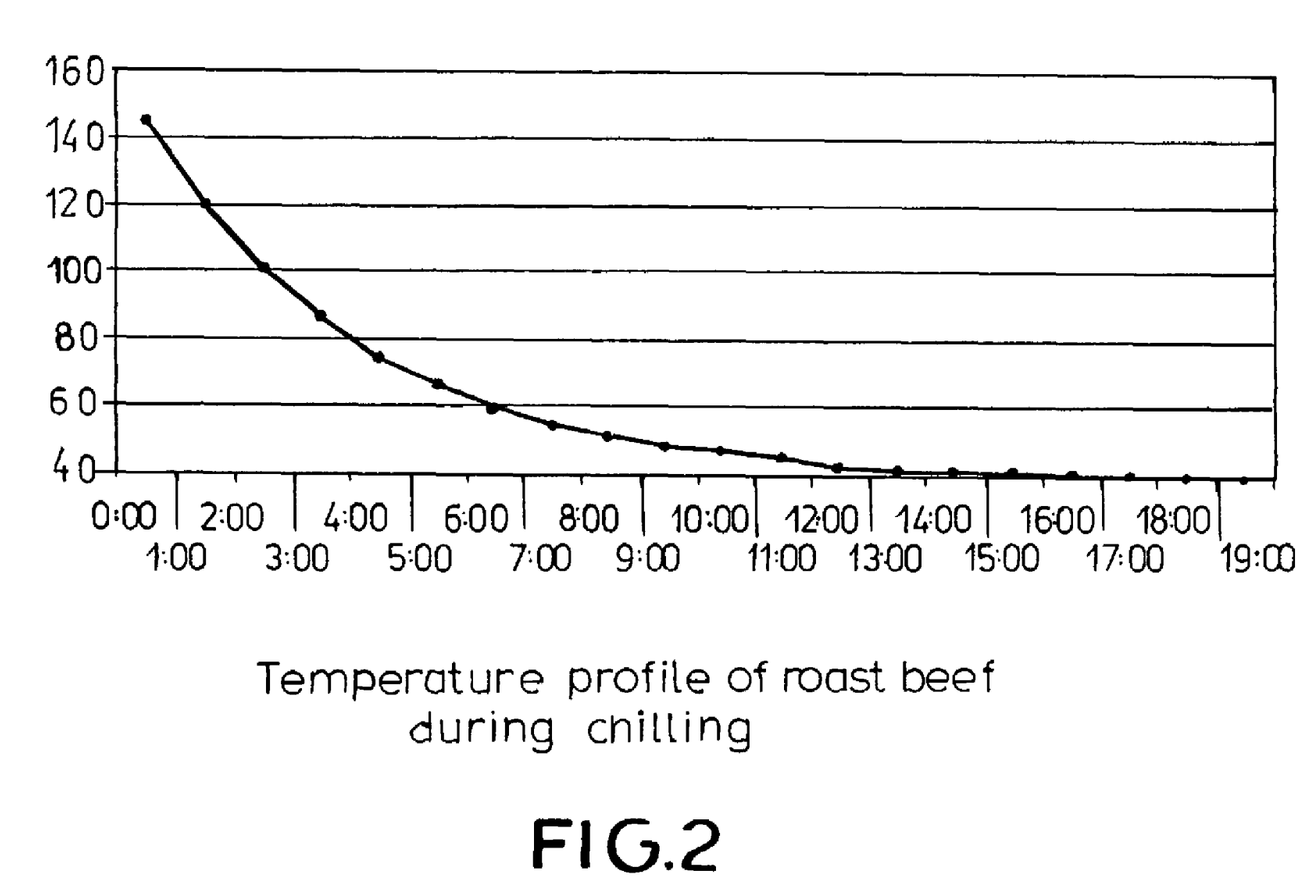
FIG. 2 is a graph of the temperature profile of roast beef during chilling.
Figure 3:
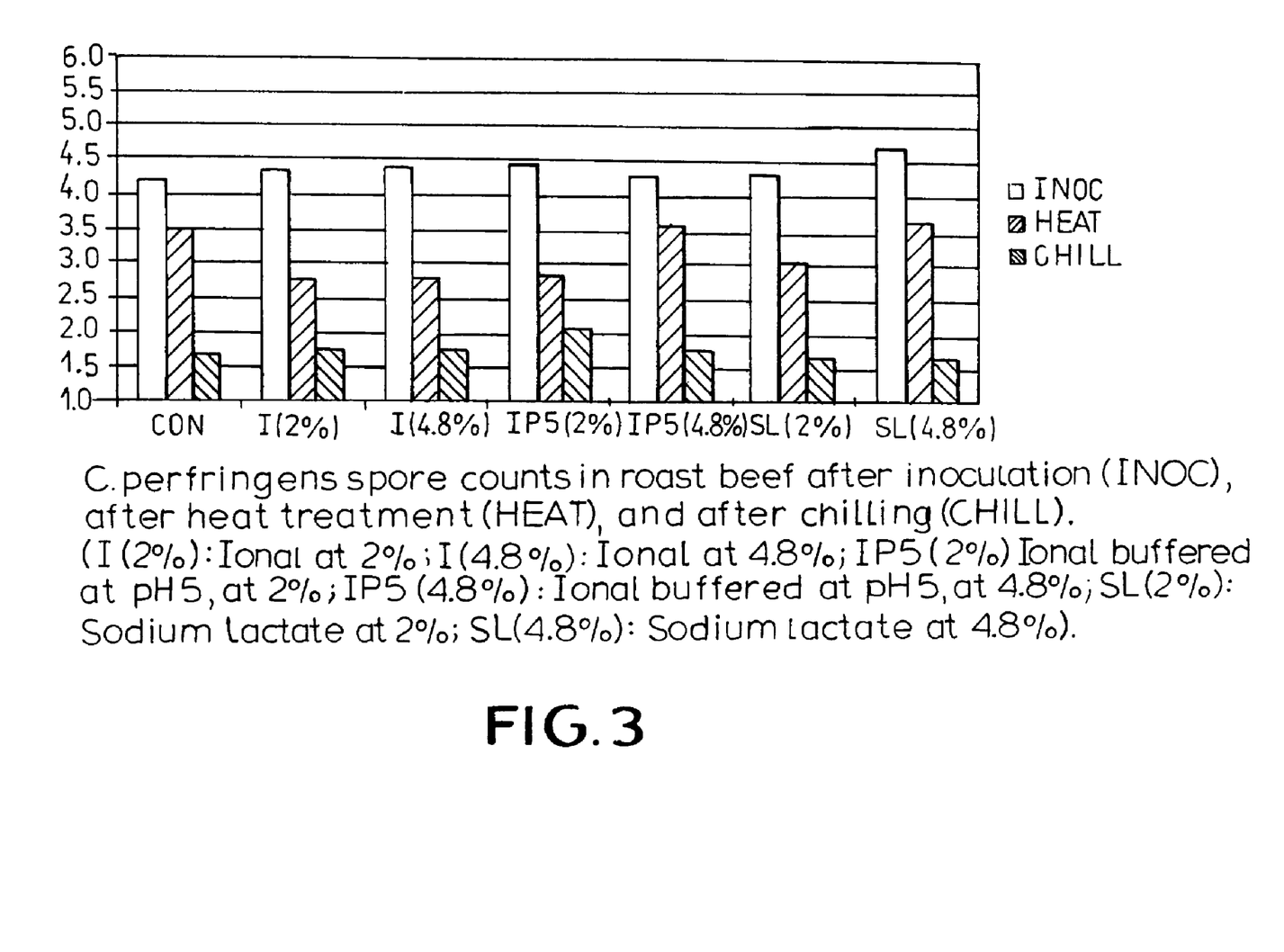
FIGS. 3 and 4 are graphs showing the *Clostridium perfringens* spore counts in roast beef after inoculation with different treatments.
Figure 4:
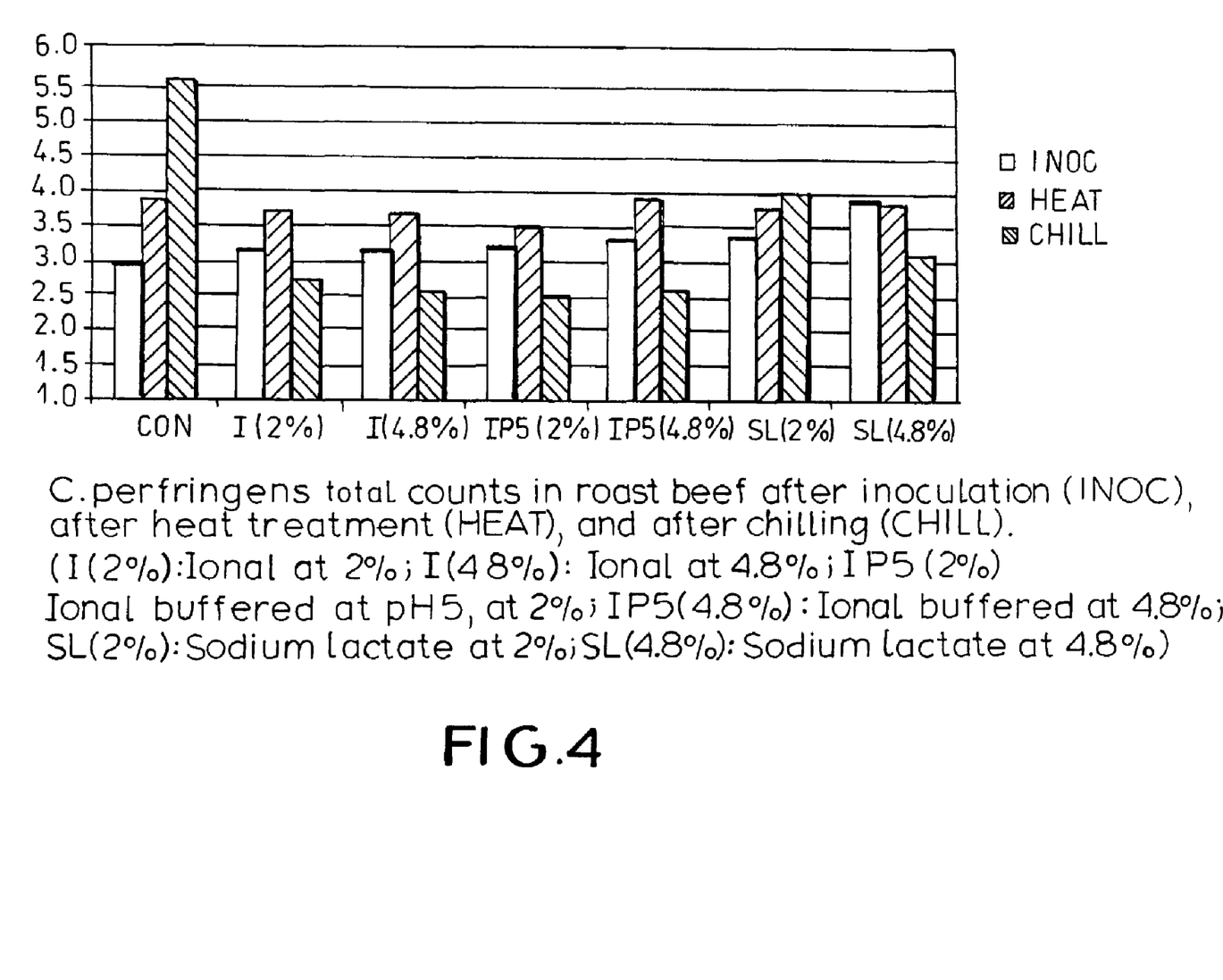

Chilling of Roast Beef:

An abusive chilling rate (FIG. 2) was replicated in a circulating water bath using a programmable temperature controller (Omega, Stamford, Conn.), and chilling was accomplished by circulating chilled brine through the water bath. The products were heated to 167° F. (75° C.) and held for 20 min (for heat activating the spores), and chilled to 145° F. immediately, and further chilling to 40° F. was accomplished following the abusive chilling rate.

Sampling and Microbiological Analysis

Sampling: After inoculation, the initial spore and vegetative cell populations of *C. perfringens* were determined by taking a 25 g sample of the inoculated meat. The products were sampled as described, after cooking and chilling to 40° F. in the water bath.

*Clostridium perfringens* enumeration: The samples were homogenized with sterile 0.1% peptone diluent (25 ml; PW) in a Stomacher Lab Blender for 2 min. Serial dilutions were prepared in PW and appropriate dilutions were plated on tryptose sulfite cycloserine (TSC) agar using double tube method (Ali et al., 1992). Tubes were incubated for 8-10 h at 37° C. under aerobic conditions. For enumeration of *C. perfringens* spore populations, the initial sample obtained (ca. 5 mL) was heated to 167° F. for 20 min and then diluted serially, plated and incubated as for total *C. perfringens* populations (Junega et al, J. Food Prot. 54; 1063-1067, 1994).

Results and Discussion:

Addition of buffered sodium citrate (pH 5.0) resulted in reduction of roast beef pH by ca. 0.4 and 0.6 units at 2.0 and 4.8% concentrations (FIG. 1). Sodium lactate and buffered sodium citrate (pH 7.0) did not affect the pH of the meat significantly.

Chilling the inoculated roast beef from 145° F. to 40° F. resulted in 1.7 log CFR/g increase in *C. perfringens* populations. Incorporation of antimicrobial ingredients, sodium lactate and buffered sodium citrate (IONAL) resulted in inhibition of *C. perfringens* spores outgrowth (FIG. 3). Although inhibition of germination and outgrowth of *C. perfringens* spores by antimicrobials sodium lactate and buffered sodium citrate (IONAL) have not been reported in literature, other commonly used antimicrobials, nitrite and potassium sorbate have been shown to be effective.

The Effect of the Combination on *Listeria monocitogenesis* in Beef Frank Samples

*Listeria monocytogenes* cultures (ATCC 13932, ATCC 49594, ATCC 43256, ATCC 51414 and ATCC 7647) were obtained from the American Type Culture Collection 9 Atlanta, Ga.). Cultures were grown in Brain Hearth Infusion (BHI) broth at 35° C. for 24 hr and kept at 4° C. until use. Each culture was then transferred from the stock collection and grown in BHI broth at 35° C. for 24 hr. Equal volume of each culture was transferred into a sterile test tube to make a mixture of 5 strains of *L. monocytogenes*. Serial dilutions of this mixture were made using 0.1% peptone water (Difco Laboratories, Detroit, Mich.) and inoculated onto the beef frank samples.

Preparation of Beef Frank Samples

Commercial beef franks were purchased from a local grocery store. The average surface area and weight of beef franks were determined prior to experiment (n=5). A single beef frank sample was placed into a vacuum packaging bag. Each bag was inoculated with a mixture of 5 strains of *L. monocytogenes*. Samples were surface treated using 1% IONAL or 1% IONAL+0.1% sodium diacetate. Control samples (no IONAL or sodium diacetate) were inoculated only with *L. monocytogenes*. Samples were vacuum packaged and kept at 4° C., and analyzed weekly. *L. monocytogenes* count was determined using Tryptic Soy (TSA) agar (Difco Laboratories, Detroit, Mich.) incubated at 35° C. for 24 hr. Experiments were repeated three times.

The average surface area and weight, of beef franks were 91.24 cm.sup.2 and 44.83 g. respectively. Initial inoculum level of L. monocytogenes was 2.5 log.sub.10 cfu/cm.sup.2. The survival of *L. monocytogenes* in control, 1% IONAL and 1% IONAL+0.1% sodium diacetate a 5.4 log.sub.10 cfu/cm.sup.2 in control sample while a 1.2 log.sub.10 cfu/cm.sup.2 and 0.85 log.sub.10 cfu/cm.sup. 2 values were determined for 1% IONAL and 1% IONAL+0.1% sodium diacetate treatments, respectively. This difference might be attributed to the bacteriostatic effect of IONAL and sodium diacetate against *L. monocytogenes*. IONAL and sodium diacetate might also induce sublethal injury which causes the reduction of the number of *L. monocytogenes* in IONAL and sodium diacetate treatments. The combination of 1% IONAL+0/1% sodium diacetate showed a slightly stronger effect than 1% IONAL against the pathogen.

Additional Beef and Pork Tests

Preparation of the Meat and Inoculation

Beef top rounds and boneless pork loins were obtained from a retail store (Athens, Ga.) and injected with minimal levels of salt (NaCl, 0.85% final concentration), potato starch (0.25%) and potassium tetra pyrophosphate (0.2%) at 12% pump rate. The products were vacuum packaged separately and shipped overnight to the USDA-ARS, Wyndmoor, Pa. laboratories and were stored under refrigeration until use. The products were diced into ca. 1 $in^3$ pieces and ground through a ⅛" plate (Hobart, Troy, Ohio) to aid in uniform distribution of the antimicrobial ingredients and *C. perfringens* spores in the product during subsequent inoculation and mixing steps. Separate packages containing 250 g of meat were prepared, vacuum packaged and stored frozen. The products were thawed, mixed with buffered sodium citrate (BSC; IONAL™) or BSC supplemented with sodium diacetate (IONAL PLUS™, BSC with 8.0% sodium diacetate (WTI Inc., Kingston, N.Y.) for 1 min in a mixer (Kitchen Aid, Troy, Ohio) and subsequently with the spore cocktail for 1 min to yield ca. 2.5 $\log_{10}$ spores/g. The product (roast beef or injected pork; 10 g) was distributed into 2"×3" cook-in bags (Koch Supply Company, Kansas City, Mo.), and vacuum sealed at 12 mbar vacuum using a Multivac (Model A300/16, Multivac Inc., Kansas City, Mo.) packaging machine.

Treatments

Seven treatments [0.5%, 1.0% and 2.0% each of BSC (IONAL™) or BSC with sodium diacetate (IONAL PLUS™), along with a control] were evaluated for each meat product (roast beef and injected pork).

Heat Shock and Cooling Procedure

Prior to cooking, two sets of bags (beef and pork) were sandwiched between a stainless steel mesh (5"×5", stainless steel; Fisher Scientific, St. Louis, Mo.) to improve heat transfer and to uniformly heat and chill the product. The set of racks were submerged completely in a water bath set at 75.5° C. (Exacal, Model RTE-221, NESLAB Instruments, Inc., Newington, N.H.), heat shocked for 20 min, removed, chilled immediately on an ice water bath, and plated as described below. A second set of racks containing the product for each treatment were heat shocked as described and transferred to a water bath set at 54.5° C., allowed to equilibrate at this temperature for 10 min and chilled at an exponential rate from 54.5° to 7.2° C. according to the desired chilling rates (FIG. 7).

Enumeration Procedure

After chilling to 7.2° C., each meat sample from the packages was transferred aseptically to a filter stomacher bag (Spiral Biotech, Bethesda, Md.). Sterile peptone water (PW, 0.1%; 20 mL) was added and stomached for 2 min (Interscience, St. Nom France). The samples were serially diluted in PW and plated on stryptose sulfite cycloserine (TSC) agar by pour or spiral plating methods and overlaid with an additional 10 ml of TSC. The TSC plates were then incubated at 37° C. for 18-24 h in a Bactron anaerobic chamber (Sheldon Laboratories, Cornelius, Oreg.) and typical colonies were enumerated as *C. perfringens*.

Statistical Analysis

Three independent trials were performed for each of the exponential chilling rates (18 and 21 hour). The data were analyzed by analysis of variance using the General Linear Model procedure of the Statistical Analysis System (SAS Institute, Inc., Cary, N.C., 2000; Release 8.01). Fisher's Least Significant Difference (LSD) was used to separate means of the residual *C. perfringens* populations ($\log_{10}$ CFR/g) of the samples.

RESULTS AND DISCUSSION

The programmed and observed temperature profiles of the products for 18 and 21 h exponential chill rates are shown in FIG. 7. Both the 18 and 21 h temperature profiles represent extended chilling rates in view of the USDA-FSIS or the FDA stabilization requirements for chilling of cooked meat and poultry products. The pH roast beef and injected pork is shown in FIG. 9 and corresponds to the normal pH of these products reported in the literature.

Chilling of control roast beef samples from 54.4. degree. to 7.2. degree. C. resulted in a 1.51-and 5.27-log.sub.10 CFU/g increase in *C. perfringens* populations when 18 and 21 h exponential chill rates were used, respectively (FIGS. 8 and 11). Chilling control injected pork samples following similar chill rates resulted in 3.70 and 4.41 log.sub.10 CFU/g increase in *C. perfringens* populations (FIGS. 10 and 12). Higher levels of *C. perfringens* populations were observed in injected pork compared to roast beef for both 18 and 21 h chill rates. These differences in germination and outgrowth of C. perfringens could be due to the higher pH of the injected pork (p.ltoreq.0.05) (FIG. 9) or the inherent differences in muscle food species (beef vs. pork).

The pH of the roast beef for each of the treatments (range: pH 5.62-5.78) was lower ($p \leqq 0.05$) compared to injected port (range: pH 5.98-6.11) by at least 0.3 pH units. Addition of IONAL™ tended to slightly increase the pH of the roast beef from pH 5.62 to 5.78, while tending to slightly reduce the pH of the injected pork from pH 6.11 to 6.07. Although these differences could be apparently minor when pH units are considered (greater differences in $H^+$ concentrations), they may be biologically significant in controlling germination and growth of *C. perfringens*. However, addition of IONAL PLUS™ did not result in pH changes ($p>0.05$) in either of the products.

I claim:

1. A method of inhibiting growth and germination of *Clostridium perfringens* and/or *Listeria monocytogenes* in or on a meat product, comprising incorporating into the meat product or onto the surface of the meat product a composition consisting essentially of an amount effective to inhibit said growth and germination of at least one compound selected from the group consisting of sodium acetate and sodium diacetate in conjunction with from about 0.2% to about 4% by weight of sodium citrate as anti-bacterial components, wherein the ratio of sodium citrate to sodium acetate or sodium diacetate is about 2:1 to about 40:1.

2. The method of claim 1 wherein said compound is introduced into said meat product in an amount of substantially 0.05% to about 2% by weight.

3. The method of claim 2 wherein said compound and said sodium citrate are introduced into said meat product in the form of a citric acid buffered solution of sodium citrate and containing 5 to 35% by weight sodium acetate.

4. The method of claim 3 wherein said citric acid buffered solution contains 75% to 95% by weight sodium citrate and 5% to 25% by weight citric acid at a pH of 4.0 to 5.8.

5. The method of claim 1 wherein the meat product is treated with a solution containing said compound and citric acid buffered sodium citrate.

6. The method of claim 5 wherein said meat product is a buffered product.

7. The method of claim 5 wherein said meat product is treated with said solution prior to cooking.

8. The method of claim 5 wherein said meat product is treated with said solution during cooking.

9. The method of claim 5 wherein said meat product is treated with said solution after cooking.

10. The method of claim 1 wherein said meat product is treated with a citric acid buffered solution of sodium citrate initially and is thereafter treated with an aqueous solution of sodium acetate and/or sodium diacetate.

11. The method of claim 5 wherein said solution is injected into said meat product.

12. The method of claim 5 wherein said solution is massaged into said meat product.

13. The method of claim 1 wherein the meat product is a ready-to-eat meat product.

14. The method of claim 1 wherein the meat product is a raw meat product.

15. The method of claim 1 wherein the meat product is treated by applying to the surface of the meat product or massaging or injecting into the meat product a solution comprising 65 to 95% sodium citrate and 5 to 35% sodium acetate or sodium diacetate.

16. The method of claim 1 wherein the meat product is treated by applying to the surface of the meat product or massaging or injecting into the meat product a solution comprising 75 to 95% sodium citrate and 5 to 25% sodium acetate or sodium diacetate.

17. The method of claim 1 wherein the meat product is treated with a composition comprising about 80% sodium citrate and about 20% sodium acetate or sodium diacetate.

18. A method of inhibiting growth of *Clostridium perfringens* and/or *Listeria monocytogenes* on and/or in a meat product comprising treating the meat product with a composition consisting essentially of 75 to 95% sodium citrate and 5 to 25% sodium acetate or sodium diacetate.

19. The method of claim 18 wherein the composition is an aqueous solution.

20. The method of claim 19 wherein the meat product is treated with a composition that provides about 1.0% sodium citrate and about 0.1% sodium diacetate or sodium acetate on the surface of or incorporated into the meat product.

21. The method of claim 19 wherein the meat product is raw meat.

22. The method of claim 19 wherein the meat product is a ready-to-eat meat product.

23. The method of claim 19 wherein the solution is massaged into the meat product.

24. The method of claim 19 wherein the solution is injected into the meat product.

25. The method of claim 19 wherein the solution is added to a package containing the meat.

* * * * *